United States Patent [19]
Drury et al.

[11] Patent Number: 5,042,225
[45] Date of Patent: Aug. 27, 1991

[54] WRAPPING APPARATUS

[75] Inventors: David J. Drury, Lincolnshire; Norman Drury, South Humbersdie, both of Great Britain

[73] Assignee: Wrap-A-Round Limited, Lincoln, United Kingdom

[21] Appl. No.: 364,424

[22] PCT Filed: Nov. 27, 1987

[86] PCT No.: PCT/GB87/00849
§ 371 Date: Jul. 27, 1989
§ 102(e) Date: Jul. 27, 1989

[87] PCT Pub. No.: WO88/03896
PCT Pub. Date: Jun. 2, 1988

[30] Foreign Application Priority Data
Nov. 27, 1986 [GB] United Kingdom ............... 8628319
Oct. 5, 1987 [GB] United Kingdom ............. 87233338

[51] Int. Cl.$^5$ .................. B65B 11/04; B65B 27/12
[52] U.S. Cl. ............................. 53/211; 53/587
[58] Field of Search ................. 53/118, 211, 587, 588

[56] References Cited
U.S. PATENT DOCUMENTS

| | | | |
|---|---|---|---|
| 4,281,500 | 8/1981 | Mueller et al. | 53/211 |
| 4,387,548 | 6/1983 | Lancaster et al. | 53/399 |
| 4,387,552 | 6/1983 | Lancaster et al. | 53/556 |
| 4,578,923 | 4/1986 | Petterson | 53/211 |
| 4,590,737 | 5/1986 | Rosenthal et al. | 53/587 X |
| 4,662,151 | 5/1987 | Mathes et al. | 53/211 |
| 4,685,270 | 8/1987 | Brambilla | 53/211 X |
| 4,712,686 | 12/1987 | Lancaster et al. | 206/597 |
| 4,815,369 | 3/1989 | Akins | 53/587 X |

FOREIGN PATENT DOCUMENTS

| | | | |
|---|---|---|---|
| 0229736 | 7/1987 | European Pat. Off. | |
| 2056401 | 3/1981 | United Kingdom | 53/211 |
| 2159489 | 5/1985 | United Kingdom | 53/211 |

Primary Examiner—Robert L. Spruill
Assistant Examiner—Linda B. Johnson
Attorney, Agent, or Firm—Locke Reynolds

[57] ABSTRACT

Apparatus for wrapping a load with wrapping material includes a frame, a platform pivotally connected to the frame about a horizontal axis to permit the platform to be tilted between a generally horizontal position and an inclined position. A load support including a pair of rollers is turnably mounted to the platform to permit the load support to be turned about a turning axis perpendicular to the platform, the rollers permitting the load to be rotated about a rotating axis transverse to the turning axis. A wrapping material dispenser is selectively positionable with respect to the frame for dispensing a strip of wrapping material to wrap said load as the load is rotated by the load rotating means and as the load support is turend with respect to the platform. A load support arresting mechanism for arresting the turning of the load support at a preselected position with respect to the platform includes a lever having a first end pivoted to the platform and a second end adapted to contact the load support. An extensible ram has a first end coupled to the frame and a second end coupled to said lever intermediate the lever first and second ends, the extensible ram being extensible among a retracted position wherein the lever second end is disengaged from the load support and the platform is horizontal an intermediate position wherein the lever second end engages the load support to prevent turning thereof, and a third position wherein the platform is tilted with respect to the frame to discharge the load.

15 Claims, 3 Drawing Sheets

WRAPPING APPARATUS

This invention relates the packaging of bulk materials formed into a bale, pack or the like.

In particular, the present invention is concerned with but not restricted to the handling of baled material such as straw or silage or other material in like divided form for use as animal feedstock.

In relation to the handling of baled material for use as feed material for animals it is a common practice to feed animals during the winter or other periods when it is not possible for the animal to feed in the open with a feed stock commonly called silage which is produced from for example, alfa, grass, hay and straw by a process in which the wilting straw or hay undergoes a controlled bacteriological change process for the success of which it is essential to exclude atmospheric air in order to avoid the risk of the material rotting or otherwise decaying in such fashion as to render the material unsuitable as a feed for animals.

There are a number of methods of storing the hay or straw for the purposes of silage production including large storage containers known as silos which comprises substantially sized and highly expensive structures.

In view of the expense and other factors involved with the maintenance of such structures, these structures are generally speaking not readily usable by other than very large farms or the like or suitable where relatively small quantities of feed are required at a particular point of time.

In order to make the production of silage a convenient and economic possiblity by those having relatively small herds of cattle and thus a relatively small feed demand at any one time or those who prefer not to utilise large permanently erected structures for silage production a silage producing technique has been introduced which involves forming bales of the hay or straw and then hermetically enclosing the bale in a plastics material so that the requisite silage production processes can take place within the container of plastics material.

One method of hermetically enclosing the bale is to introduce the straw or hay into a plastics bag and then seal the bag. It has been found that whilst the process of introducing the bale into a plastics bag appears to be relatively simple operation difficulties have been found in the utilsation of such containers, including those arising from the problem of ensuring a hermetic sealing of the container.

With a view to ovecoming such difficulties it has been proposed to wrap bales by means of a continuous strip of plastics material one of whose characteristics of use is that it has to be pre-stretched by an optimum amount in order that it will be effective as a a bale wrapping material. The bale is wrapped in such manner that the baled material is 'effectively totally enclosed or shrouded in several layers of the plastics strip. To achieve the required wrapping it is necessary to wrap the bale in such manner that all air is excluded from the baled material and that respiration of the baled material is prevented.

In order to obtain and ensure the requisite air tightness the wrapping strip of plastics material, which is delivered to a wrapping position from a reel thereof has to be maintained under a tension controlled within predefined limits. In addition, in order to achieve the total plastics enclosure it has been found necessary to be able to rotate the bale about two axes at right angles to each other. In the case of the so-called 'big' bale which has a cylindrical shape it is necessary to rotate the bale about its longitudinal axis and also about a second axis transverse to the longitudinal axis and passing through the centre of the bale. In addition, the rotation of the bale in these two directions of rotations is such that the each part of the surface thereof is progressively moved into a setting in which it can be brought into the wrapping position. It is also to be noted that the preferred wrapping technique is in the end-to-end sense accompanied with rotation of the bale through a predetermined angle about its longitudinal axis at the finish of each end-to-end complete rotation.

In addition, in situations where the hay, straw or other material is required for more immediate use the bales thereof are partially wrapped with a wrapping serving essentially to hold the material in the baled state. In the case of the so-called large bale this partial wrapping is called barrel wrapping.

It is an object of the invention to provide improved apparatus for wrapping such baled material.

According to the present invention there is provided apparatus for wrapping a load with wrapping material in strip form, including a main frame, a load support unit for a load to be wrapped rotatably mounted to the main frame for rotation about a first axis of rotation, means for rotating the load when on the load support unit about a second axis of rotation transverse to the firat axis of rotation, wrapping material dispenser means for enabling delivery of the load wrapping material from a supply thereof for the purposes of wrapping the load during the rotation thereof, the arrangement being such that when the load is subjected to rotation about both said axes the load can be so wrapped by edgewise overlap of adjacent lengths of the strip form wrapping, the load support unit being so pivotally mounted to the main frame that the load support means can be tilted to discharge the load characterised in that the braking means are provided for arresting rotation of the load support unit when in a predetermined position with respect to the main frame, and in that the braking means is adapted so as to have the additional function of tilting the load support unit for the purposes of discharging a wrapped load.

Preferably when the braking means has arrested rotation of the load support unit the rotation of the load can continue about the second axis the arrangement being such that when the rotation of the load is restricted to rotation about the second axis the load can be partially wrapped, and in that the dispensing means is selectively positionable with respect main frame so that the wrapping material can be so dispensed that the surface of the load that is being rotated about said second axis can be wrapped.

Conveniently, the braking means incorporates a hydraulic cylinder, the arrangement being such that on operating the hydraulic cylinder a first operational setting is adapted to lock the load support unit against rotation and in a predetermined position with respect to the platform, and in that further operation of the hydraulic cylinder to a second operational setting is arranged to tilt the support means sufficiently to discharge a load therefrom.

Conveniently, the apparatus includes a means for controlling the tensioning of strip material including a friction braking arrangement in the feed path of the strip material from a supply thereof to a utilisation location.

Preferably, the friction braking arrangement includes a roller arranged to be driven by movement of the strip material from a supply to a location of use, and a friction brake for constraining the freedom of rotation of the roller rotation.

Conveniently a selectively adjustable eccentric cam arrangement is provided to adjusting the braking effect.

For a better understanding of the invention and to show how to carry the same into effect reference will now be made to the accompanying drawings in which.

Figure 5:
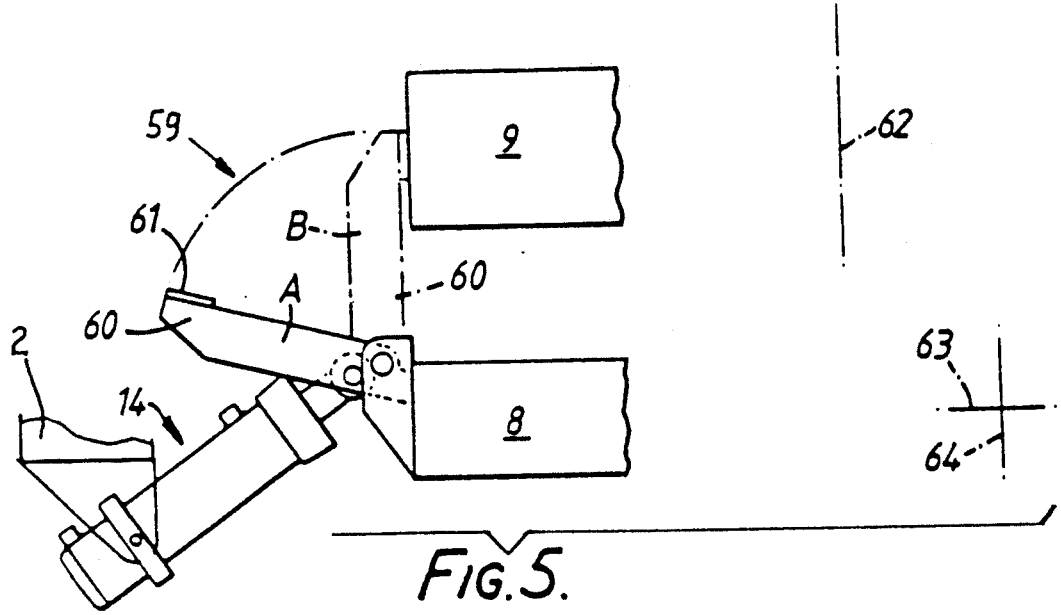
Figure 6:
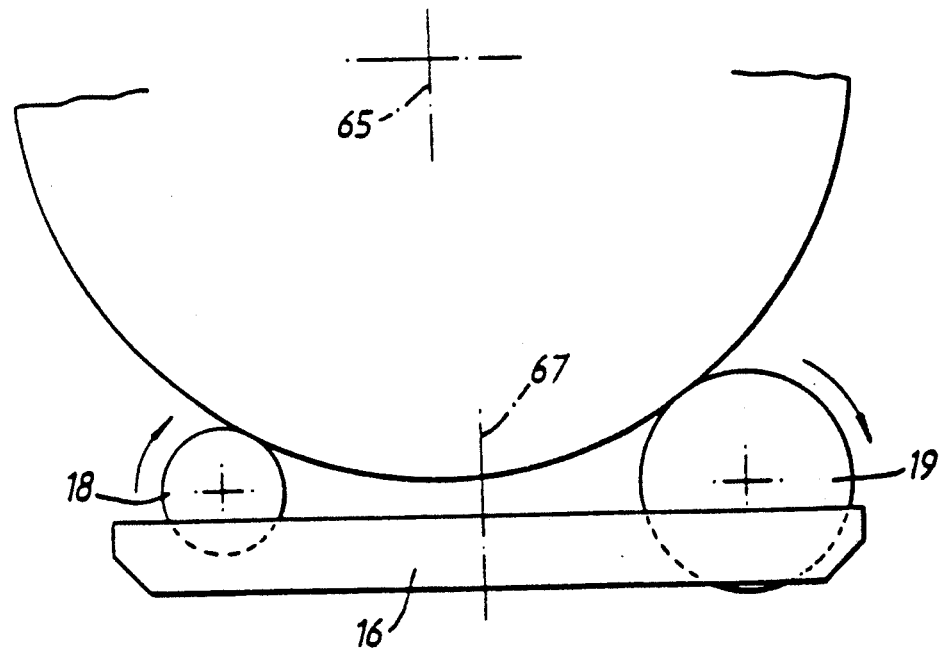

FIG. 5 schematically illustrates an arrangement for locking the load support means against rotation about a first axis, and for effecting load discharge tilt of the load support means on completion of a wrapping operation; and FIG. 6 is a schematic view to an enlarged scale of a detail of part of the arrangements provided for rotating a load whilst on the support means.

Figure 1:
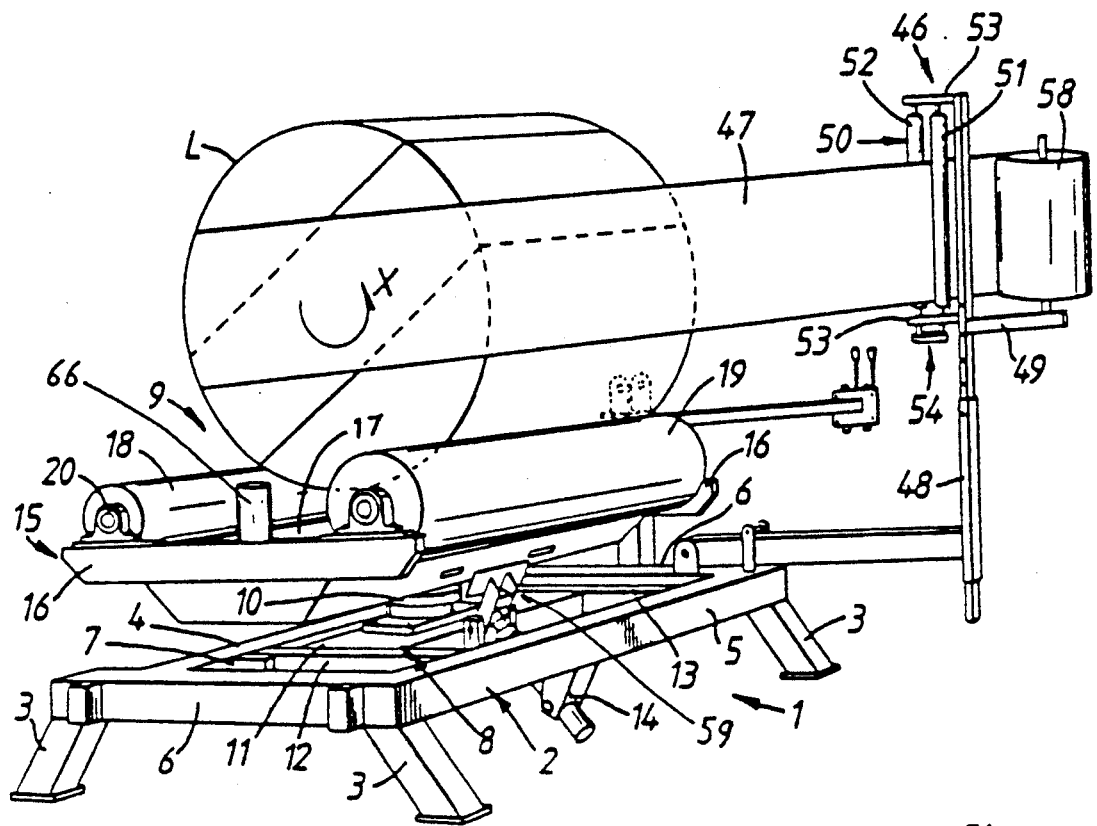
FIG. 1 is a schematic perspective view of a first embodiment of apparatus for enabling the wrapping of a load such as a bale of straw or hay, the Figure illustrating a load support means enabling rotation of the load about two axes transverse to each other.
Figure 2:
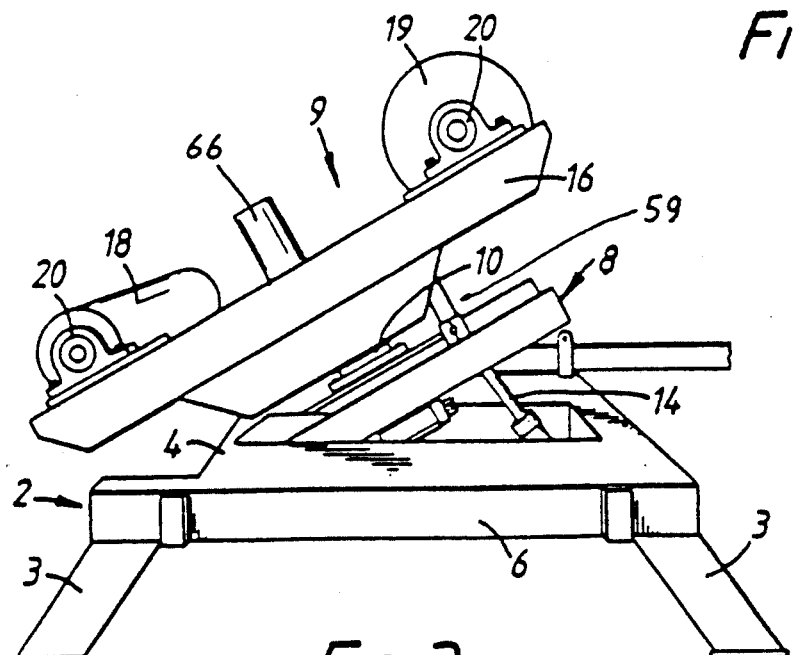
FIG. 2 is an oblique view of the apparatus of FIG. 1 illustrating the apparatus when in an intermediate setting, as arises during unloading of a wrapped load from the apparatus.

Referring to FIGS. 1 and 2, these illustrate a load wrapping apparatus incorporating a rotatable load suporting turntable assembly 1 mounted for rotation upon a generally rectangular base frame 2 supported by legs 3.

If the apparatus is to be towable by a tractor or the like the frame 2 will be adapted for mounting wheels (not shown) and, if necessary, the legs 3 will be pivotal between a frame support setting shown in the Figures and a stowed or towing position (not shown). To facilitate such towing the frame is provided with a tractor connecting or hitching assembly (not shown).

The base frame 2 includes side rails 4 and 5 and end rails 6. The side rail 4 is spaced inwards of the associated ends of the rails 6, and is provided with sets of mounting lugs or the like 7 (only one set being indicated) for mounting for pivotable movement about a horizontal axis a tiltable platform 8 upon which a turntable unit 9 is rotatably mounted so that the turntable unit 9 can be rotated by a drive unit 10 about a vertical axis when the tiltable platform 8 is in the position shown in FIG. 1.

The platform 8 incorporates a main support section 11 which mounts (as will be considered hereinafter) the drive unit 10. The section 11 is supported from two frame members 12,13 which are pivotally connected to the lugs or the like 7 provided on the main frame rail 4 so that the platform 8 is pivotable about the horizontal axis between a horizontal setting as shown in FIG. 1 and an inclined position in which any load 'L' that may be on the turntable assembly can be readily discharged from the assembly. FIG. 2 illustrates an intermediate position of the tiltable platform 8. The tilting is conveniently effected by means of a hydraulic or pneumatic ram arrangement 14 to be considered hereinafter.

The turntable unit 9 incorporates a frame structure 15 including a pair of end rails 16 connected a central main section 17 providing an upper surface of a generally rectangular overall shape, the conection being such that the end rails 16 effectively form with the central section 17 an H formation.

Rolls 18 and 19 are rotatably mounted to the projecting ends of the rails 16 by way of bearing units 20 provided upon the projecting ends. A drive arrangement (to be considered hereinafter) is provided for transmitting drive from the drive unit 10 to the rolls 18 and 19.

Figure 3:
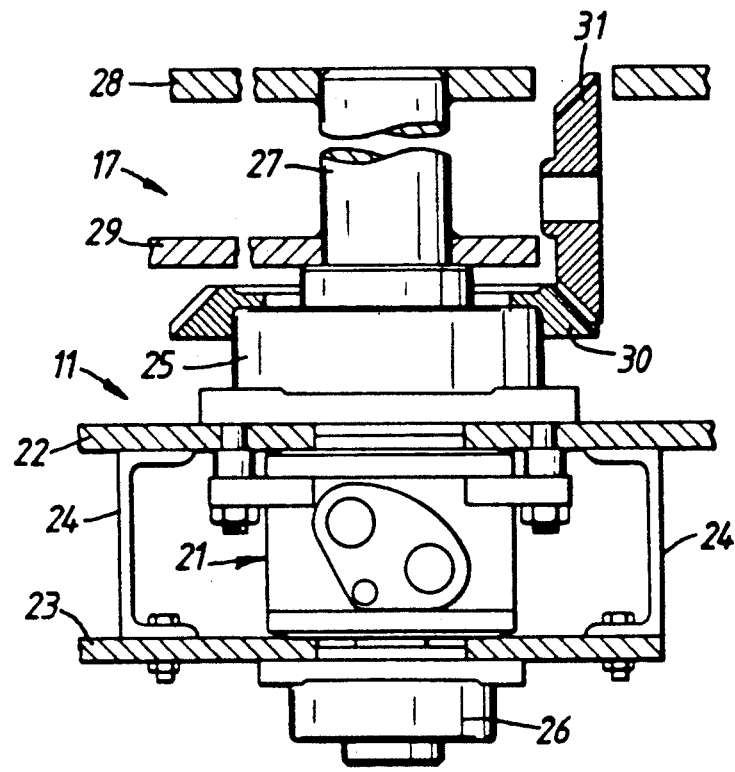
FIG. 3 is a part sectional detailed side elevation of part of a drive mechanism for effecting said rotation of the load support means shown in FIG. 1.

An embodiment of the drive unit 10 for the turntable unit 9 is shown in the FIG. 3. The drive unit 10 includes a hydraulic motor 21 mounted to the central section 11. As will be seen, the central section 11 includes upper and lower plates 22 and 23 which are stiffened with respect to each other in the vicinity of the motor 21 by channel cross-section stiffening members 24. The motor 21 is mounted top and bottom by way of flanged bearing units 25 and 26. In the figure the units 25 and 26 are shown externally mounted. If more convenient, the bearing units could be selected so as to be internally mountable. As is indicated in the FIG. 3 the output shaft 27 of the motor 21 is coupled directly to the central section 11 of the turntable unit 9 whereby the latter is rotated directly. In the Figure the central section 11 is shown to include upper and lower plates 28 and 29. This direct drive avoids the use of gear boxes or the like between the motor 21 and the turntable unit 9.

A bevel gear 30 is arranged concentrically of the motor shaft 27 and is constrained so as not to rotate with the shaft 27 and thus the turntable unit 9.

Figure 4:
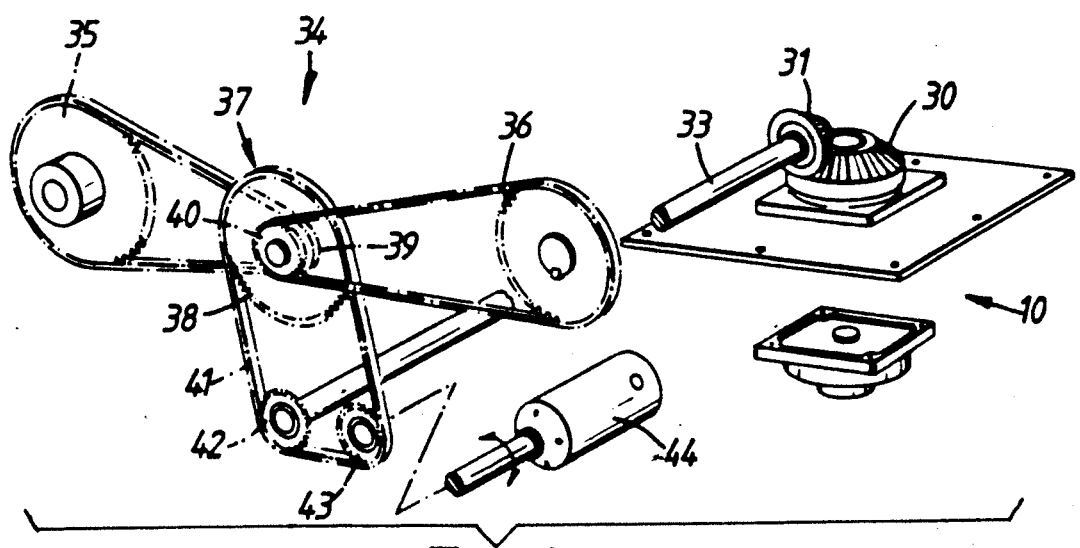
FIG. 4 is a schematic view of arrangements for rotating load support rollers.

FIG. 4 illustrates a drive arrangement for driving the rolls 18 and 19 from the gear 30 through a bevel gear 31 which is arranged to drive the input shaft 33 to a chain drive system 34. For this purpose the chain drive system 34 includes chain wheels 35 and 36 respectively directly associated with the rolls 18 and 19 and constrained to rotate therewith. The chain drive system 34 also includes a chain wheel set 37 comprising a chain drive input wheel 38 and two drive output chain wheels 39 and 40 constrained to rotate together. As will be seen from the Figure the chain wheels 35 and 39 are drivingly interconnected, and the chain wheels 36 and 40 are drivingly interconnected.

The drive input wheel 38 is coupled through a chain 41 to receive drive from one or the other of two drive input chain wheels 42 and 43. These wheels are free wheels and are such as to effect drive in the anti-clockwise direction as seen in the Figure. Of these drive input wheels 42 and 43 the wheel 42 is provided at one end of the shaft 33 which carries at its other end the bevel gear 31. The other driven chain wheel 43 is connectable to receive drive from an independent drive source 44 which can be a hydraulic motor. With this arrangement the chain 41 may be selectively driven either by way of the freewheel 42 from the drive unit 10, or independently thereof from the motor 44 through the freewheel 43.

With this arrangement the rolls 18 and 19 can, if desired, be rotated without it being necessary to rotate the turntable assembly 1.

In the embodiment shown the two rolls 18 and 19 have different diameters and are mounted to ends of the the rails such that their axes of rotation lie in the same plane. The drives to the rolls are such that the rolls rotate at a matched peripheral speed.

With the apparatus as so far described it will be appreciated that when a load 'L' is resting upon the rolls 18 and 19 rotation of the latter will cause the load to rotate about a horizontal axis i.e., in the case of a cylindrically shaped load lying with its axis of symmetry horizontal about this axis, and that rotation of the turntable unit 9 will cause the load 'L' to turn around a vertical axis coaxial with that of the shaft 27 of the drive unit motor 21.

Since it desired to be able to wrap the load 'L' with a a continuous length of plastics strip the apparatus includes a support and dispenser unit 46 for the strip plastics wrapping material 47 shown in FIG. 1. The unit 46 includes a main support post structure 48 which is lengthwise adjustable and which carries a mounting arbour 49 for receiving a reel or drum of the plastics strip material 47. The unit 46 also includes a strip material prestretching and feed tension control device 50 including a pair of rolls 51 and 52 mounted for rotation about axes parallel to the axis of the reel arbour 49 whereby they are engageable by the strip material 47 as it moves in its feed path to the load 'L' to be wrapped.

The support post structure is so mounted that it is movable to a stowed position when not required for use, and also if thought necessary positionable in an alternative operation position as will be considered hereinafter.

As so far discussed the strip material 47 is pulled from the reel thereof by the rotational movement of the load 'L'. As indicated above it is important to ensure that the wrapping material 47 is maintained at or within a specified tension range so as to ensure that the requisite prestretching and thus tightness of wrapping of the load 'L' is achieved. To ensure that the material will be fed to the wrapping region at the optimum tension required for the pre-streching of the plastics material the latter is passed through the tension control device 50. The latter includes rolls 51 and 52 by upper and lower support elements 53. The roll 51 is a driven roll in the sense that it is caused to rotate as a direct consequence of pull exerted thereupon by the material 47 being fed to the load 'L' to be wrapped. The roller 52 is an idler roller. It should be noted that, if desired, additional idler rollers (not shown) can be provided. The rate of rotation of the driven roller determines the tension produced in the wrapping material 47.

Figure 1A:
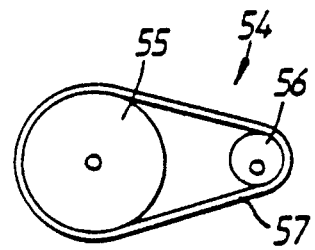
FIG. 1A is an enlarged view of a detail of FIG. 1.

In order that the tension can be controllably varied a friction braking arrangement 54 (FIG. 1A) is provided for enabling the selective tension control. This friction brake arrangement 54 involves a flywheel 55 constrained to rotate at the speed of the driven roller 51, and an eccentric cam 56 connected to receive drive from the flywheel by way of a friction brake belt drive 57 which remains at rest. The cam 56 is selectively rotatable about an axis parallel to that of the flywheel and thus the driven roll 51. With this arrangement the rate of rotation of the roll 51 can be adjusted by rotation of the eccentric cam 56 which rotation varies the braking tension in the belt 57 and thus the possible rate of rotation of the roller in relation to a strip material pull-off tension. Since the plastics strip film-like material is being pulled away from the reel 58 at a rate set by the rate of rotation of the turntable unit 9 it will be apparent that by braking the pull-off from the reel of plastics material (by controlling the rate of rotation of the feed roller 51), the plastics strip 47 will be tensioned by an amount related to the braking effect produced by the belt 57. Hence, the tension in the plastics strip 47 will be altered according to alteration of the rotation rate of the driven roller 51.

In order totally to enclose the load 'L' with the strip material 47 the load 'L' is subjected to the rotation about both of the above mentioned axes of rotation.

In practice, the rates of rotation of the turntable unit 9 and that of the rolls 18 and 19 is so inter-related that the rate of rotation of the unit 9 about the vertical axis is considerably greater than that about the horizontal axis so that during a complete revolution about the vertical axis the load 'L' is effectively stepped through a relatively small angular amount for example 5 to 10 degrees of arc about the horizontal axis so that by the time a load 'L' has been effectively fully enclosed in the plastics material the load is encased in several layers of the plastics material 47. At the completion of a wrapping operation the drive to the turntable unit 9 and rolls 18 and 19 is stopped, the plastics strip cut from the supply and the cut end firmly attached to the wrapped load. Afterwhich the load is discharged from the apparatus by tilting the platform as indicated in FIG. 2 by operation of the hydraulic arrangement 14.

Through out this wrapping mode the dispenser 46 is located in the position shown in FIG. 1. When it is required partially to wrap the load, by rotation about a single axis the rotation of the turntable unit 9 is prevented by an arresting mechanism 59 (schematically shown in FIG. 5) whilst allowing rotation the load 'L' supported on the rolls 18 and 19 of the turntable unit 9. With this arrangement the load would be partially wrapped. In the case of a cylindrically shaped load only the cylindrical surface thereof is wrapped thereby producing a so-called barrel wrapping.

For the purpose of this mode of wrapping the dispenser and tensioning unit 46 is moved to a horinzontal setting (not shown) in which the plane of strip material being fed to the load to be wrapped is horizontal. With this mode of wrapping the unit 46 is traversed lengthwise of the load in cases where the length of load to be wrapped is greater than the width of the strip plastics material 47. This traverse may be manual or arrangements for automatically effecting a traverse can be provided.

The arresting mechanism 59 makes use of the hydraulic or pneumatic ram provided for tilting the platform 8. The ram arrangement 14 is additionally connected to control movement of a pivoted lever member 60 carrying a pad 61. The lever is pivoted to a convenient location on the tiltable platform 8 as to be displaceable by the ram arrangement 14 between a position A in which the turntable unit 9 is free to rotate and an arresting position B in which the pad 61 engages with the turntable unit to prevent rotation thereof.

The arrangement of the connection between the ram 14 and the lever member 60 is further such that, after the arresting position B has been set, further operation of the ram arrangement 14 causes the tiltable platform 8 to tilt sufficiently far as to cause the load 'L' to roll off the turntable unit 9 and thereby discharge the load.

In FIG. 5 the line of action of the vertical axis of rotation of the turntable unit 9 and the axis of tilt of the platform 8 are respectively indicated by the line 62 and the intersection of the lines 63 and 64.

Referring now to FIG. 6 this Figure demonstrates the purpose of having rolls of different diameters. In practice, by providing differently sized rolls 18 and 19 it has been found that if the larger diameter roll 19 is effectively the lead roll in terms of rotation of the load 'L' whilst the load is being wrapped the load is bodily displaced towards the smaller roll 18. That is to say the center of weight 65 of the load 'L' is offset towards the axis of rotation of the smaller roll 18 from the effective or true center line 67 of the two rolls. This is shown in FIG. 6. In practice, it has been found that any tendency for the load to climb up the rolls 18 and 19 during the load wrapping procedure is eliminated so that the stability of the load 'L' during wrapping is maintained.

The rolls 18 and 19 can, if desired, carry an endless belt or group of belts (not shown) if it is desired to provide a flexible support platform for a load 'L' to be wrapped. With this arrangement loads i.e., bales, of various sizes and shapes can be carried by the turntable unit 9, and which do not necessarily bridge the separation between the rolls.

It will be appreciated that whilst a particular reference has been made to the wrapping of bales other forms of load could be so wrapped.

In order to prevent a load from travelling lengthwise of the rols 18 and 19 sufficiently for the load L to slip-off the rolls 18 and 19, an upstanding roll 66 is provided at each end of the turntable 9. The rolls 66 are rotatable about vertical axes. The height of the rolls 66 is sufficient to prevent excessive axial movement of a load L lengthwise of the rolls 18 and 19.

It will be appreciated that in the event that a load L contacts a roll 66, the fact that the roll 66 is rotatable about a vertical axis ensures that the discharge of a load from the turn table unit 9 is not impeded as the roll 66 rotates in the sense of the discharging load L.

We claim:

1. Apparatus for wrapping a load with wrapping material comprising:
   a frame, a platform, pivot means pivotally connecting the platform to the frame about a horizontal axis to permit the platform to be tilted between a generally horizontal position and an inclined position, and tilting means for tilting the platform with respect to the frame about the axis defined by said pivot means;
   a load support, turning means mounting the load support to the platform to permit the load support to be turned about a turning axis perpendicular to the platform, and load rotating means mounted on the load support for rotating said load about a rotating axis transverse to the turning axis;
   dispensing means selectively positionable with respect to the frame for dispensing a strip of wrapping material to wrap said load as the load is rotated by the load rotating means and as the load support is turned with respect to the platform; and
   arresting means coupled to said tilting means for arresting the turning of the load support at a preselected position with respect to the platform prior to the tilting of the platform with respect to the frame to discharge the load.

2. The apparatus of claim 1 wherein said tilting means comprising an extensible ram having a first end coupled to the frame and a second end coupled to the platform through the arresting means.

3. The apparatus of claim 2 wherein the extensible ram is extensible among a first position wherein the arresting means is disengaged from the load support and the platform is horizontal, a second position wherein the arresting means engages the load support, and a third position wherein the platform is tilted with respect to the frame.

4. The apparatus of claim 1 wherein said arresting means comprises a lever having a first end pivoted to the platform and a second end adapted to contact the load support.

5. The apparatus of claim 4 wherein said tilting means comprising an extensible ram having a first end coupled to the frame and a second end coupled to said lever intermediate the first and second ends.

6. The apparatus of claim 5 wherein the extensible ram is extensible among a retracted position wherein the lever second end is disengaged from the load support and the platform is horizontal, an intermediate position wherein the lever second end engages the load support, and a third position wherein the platform is tilted with respect to the frame to discharge the load.

7. The apparatus of claim 1 further comprising coupling means coupling the turning means and the load rotating means so that the load is rotated in response to a turning of the load support about the turning axis.

8. The apparatus of claim 7 wherein the coupling means comprises gear means carried by the load support and driven by a first gear fixed to the platform, and driving means connecting the gear means to the load rotating means for driving the rotation of the load rotating means in response to movement of the gear means.

9. The apparatus of claim 8 further comprising power means coupled to the driving means for selectively powering the rotation of the load rotating means irrespective of any movement of the gear means.

10. Apparatus for wrapping a load with wrapping material comprising:
    a frame, a platform, pivot means pivotally connecting the platform to the frame about a horizontal axis to permit the platform to be tilted between a generally horizontal position and an inclined position, and tilting means comprising an extensible ram having a first end coupled to the frame for tilting the platform with respect to the frame about the axis defined by said pivot means;
    a load support, turning means mounting the load support to the platform to permit the load support to be turned about a turning axis perpendicular to the platform, and load rotating means mounted on the load support for rotating said load about a rotating axis transverse to the turning axis;
    dispensing means selectively positionable with respect to the frame for dispensing a strip of wrapping material to wrap said load as the load is rotated by the load rotating means and as the load support is turned with respect to the platform; and
    arresting means coupled to a second end of the extensible ram of said tilting means for arresting the turning of the load support at a preselected position with respect to the platform, the extensible ram being extensible among a first position wherein the arresting means is disengaged from the load support and the platform is horizontal, a second position wherein the arresting means engages the load support, and a third position wherein the platform is tilted with respect to the frame to discharge the load.

11. The apparatus of claim 10 further comprising coupling means coupling the turning means and the load rotating means, the coupling means comprising gear means carried by the load support and driven by a first gear fixed to the platform, and driving means connecting the gear means to the load rotating means for driving the rotation of the load rotating means in response to movement of the gear means.

12. The apparatus of claim 11 further comprising power means coupled to the driving means for selectively powering the rotation of the load rotating means irrespective of any movement of the gear means.

13. Apparatus for wrapping a load with wrapping material comprising:

- a frame, a platform, and pivot means pivotally connecting the platform to the frame about a horizontal axis to permit the platform to be tilted between a generally horizontal position and an inclined position;
- a load support, turning means mounting the load support to the platform to permit the load support to be turned about a turning axis perpendicular to the platform, and load rotating means mounted on the load support for rotating said load about a rotating axis transverse to the turning axis;
- dispensing means selectively positionable with respect to the frame for dispensing a strip of wrapping material to wrap said load as the load is rotated by the load rotating means and as the load support is turned with respect to the platform;
- arresting means for arresting the turning of the load support at a preselected position with respect to the platform, the arresting means comprising a lever having a first end pivoted to the platform and a second end adapted to contact the load support; and
- tilting means for tilting the platform with respect to the frame about the axis defined by said pivot means the tilting means comprising an extensible ram having a first end coupled to the frame and a second end coupled to said lever intermediate the first and second ends, the extensible ram being extensible among a retracted position wherein the lever second end is disengaged from the load support and the platform is horizontal, an intermediate position wherein the lever second end engages the load support to prevent turning thereof, and a third position wherein the platform is tilted with respect to the frame to discharge the load.

14. The apparatus of claim 13 further comprising coupling means coupling the turning means and the load rotating means, the coupling means comprising gear means carried by the load support and driven by a first gear fixed to the platform, and driving means connecting the gear means to the load rotating means for driving the rotation of the load rotating means in response to movement of the gear means when the extensible ram is in said first position.

15. The apparatus of claim 14 further comprising power means coupled to the driving means for selectively powering the rotation of the load rotating means without any movement of the gear means when the extensible ram is in said second position.

* * * * *

UNITED STATES PATENT AND TRADEMARK OFFICE
CERTIFICATE OF CORRECTION

PATENT NO. : 5,042,225

DATED : August 27, 1991

INVENTOR(S) : David J. Drury and Norman Drury

It is certified that error appears in the above-identified patent and that said Letters Patent is hereby corrected as shown below:

On the title page under the heading "(75) Inventors.", please delete "Humbersdie" and insert therefor --Humberside--;

On the title page under the heading "(30) Foreign Application Priority Data," please delete "87233338" and insert therefor --8723338--; and In the ABSTRACT, line 14, please delete "turend" and insert therefor --turned--.

Signed and Sealed this

Sixteenth Day of March, 1993

Attest:

STEPHEN G. KUNIN

*Attesting Officer*         *Acting Commissioner of Patents and Trademarks*